May 18, 1948. H. K. MOORE 2,441,831
GLAZING UNIT
Filed Jan. 24, 1942 2 Sheets-Sheet 1

Inventor
HAROLD K. MOORE.
By Frank Fraser
Attorney

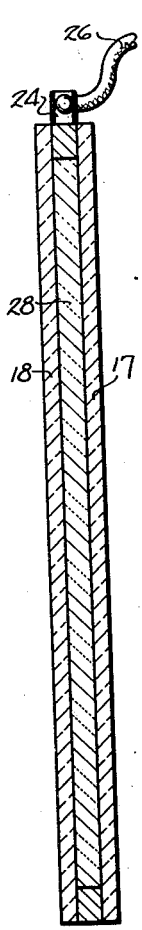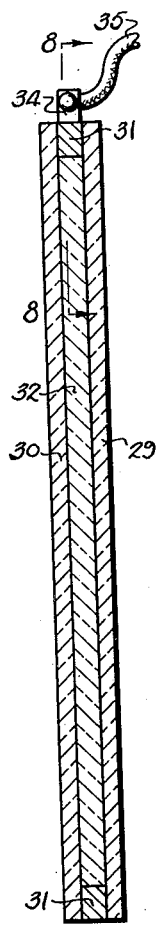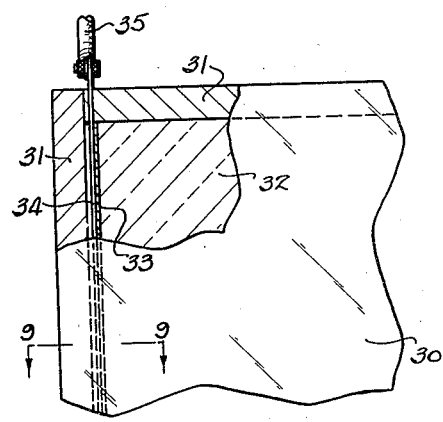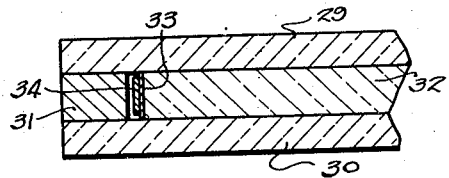

Patented May 18, 1948

2,441,831

UNITED STATES PATENT OFFICE 2,441,831

GLAZING UNIT

Harold K. Moore, Toledo, Ohio, assignor to Libbey-Owens-Ford Glass Company, Toledo, Ohio, a corporation of Ohio Application January 24, 1942, Serial No. 428,108

10 Claims. (Cl. 219—19)

The present invention relates broadly to improvements in glazing units and more particularly to multiple glazing units of the type including two sheets or plates of glass secured together in spaced face to face relation by separator means arranged therebetween and extending around the marginal portions thereof.

An object of the invention is the provision of a glazing unit of this character which, while especially adapted for glazing the windshield and/or window openings in airplanes and other aircraft, may be advantageously employed for glazing openings wherever adequate clear vision is required under adverse weather conditions.

Another object of the invention is the provision of a glazing unit of this character embodying novel means for heating the glass sheets to prevent the formation of frost, ice, etc., on the outer sheet and the condensation of moisture upon the inner sheet or to effect the removal thereof.

A further object of the invention is the provision of a glazing unit of this character having a transparent, electrically conducting medium arranged between the two sheets of glass and acting as a resistor to effect the heating of the glass sheets whereby to maintain them at a temperature sufficiently high to effectively prevent the frosting, clouding, or icing of the unit under adverse weather conditions.

Other objects and advantages of the invention will become more apparent during the course of the following description when taken in connection with the accompanying drawings.

In the drawings wherein like numerals are employed to designate like parts throughout the same:

Figure 4:
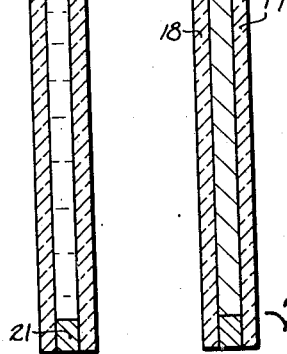
Figure 2:
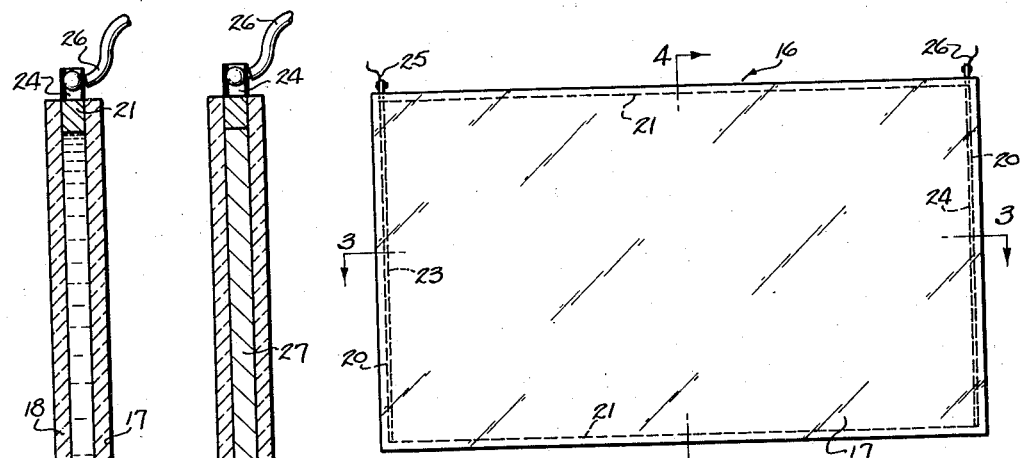
Fig. 2 is a plan view of one form of glazing unit provided by the invention.
Figures 3, 5:
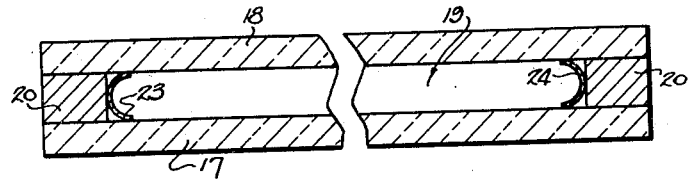

Figs. 3 and 4 are horizontal and vertical transverse sections taken respectively on lines 3—3 and 4—4 of Fig. 2;

Figs. 5, 6 and 7 are vertical transverse sections through modified types of glazing units also embodying the invention;

Fig. 8 is a vertical section taken substantially on line 8—8 of Fig. 7; and

Fig. 9 is a horizontal transverse section taken substantially on line 9—9 of Fig. 8.

Figure 1:
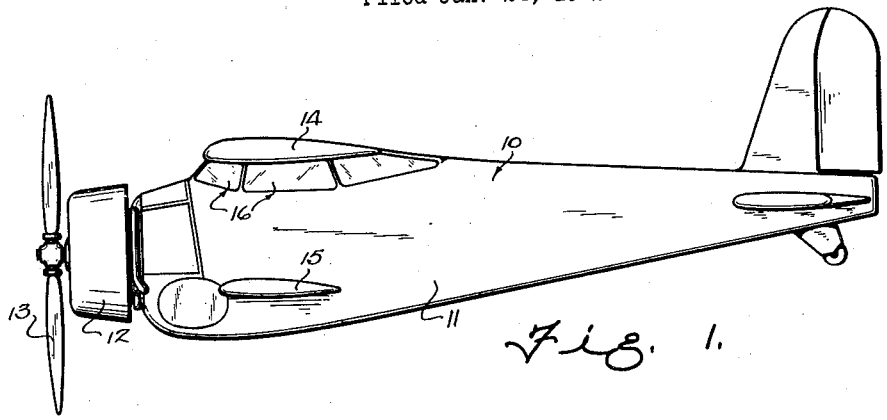
Fig. 1 is a side elevation of one type of airplane with which the present invention may be used.

With reference now to the drawings, there is shown in Fig. 1 an airplane 10 of that type having a fuselage 11 with a forwardly located engine 12 and propeller 13. The plane is also provided with upper and lower wings 14 and 15 and a cockpit having the transparent closure 16 which substantially completely enclose the pilot and enable him to have a wide sphere of vision. The transparent closures 16 include the windshield which is located in front of the pilot and the windows arranged along opposite sides of the plane. It will of course be appreciated that the airplane herein disclosed is simply one type of plane with which the present invention may be used and that the invention is adapted for use in aircraft of all kinds. In fact, the invention may be used in glazing any opening where adequate clear vision is required under adverse weather conditions such as, for example, in aircraft carriers and other naval vessels, airport control towers, lighthouses, etc.

Referring particularly to Figs. 2, 3 and 4, there is disclosed a transparent closure 16 in the form of a double glazing unit comprising the two transparent panels 17 and 18 arranged in face to face relation but spaced from one another to provide a chamber 19 therebetween, said panels being secured together by vertical spacer strips 20 provided at opposite ends of the unit and by horizontal spacer strips 21 arranged at the bottom and top thereof. While the transparent panels 17 and 18 preferably consist of sheets or plates of glass which may or may not be semi-tempered or fully tempered as desired, they may also be formed of a relatively hard transparent plastic. The separator strips 20 and 21 may be of any suitable material such as, for example, glass which may be fused or cemented to the glass sheets 17 and 18 to provide a hermetically sealed space or chamber therebetween.

According to the invention, the space or chamber 19 between the glass sheets 17 and 18 is filled with a transparent, electrically conducting medium 22 consisting of a special liquid in which an electrolyte is dissolved. By way of example, the conducting medium may consist of a highly viscous solution of polyvinyl alcohol and sulphuric acid in water, the water serving as the solvent while the sulphuric acid constitutes the electrolyte. A solution of polyvinyl alcohol, water, and sulphuric acid is essentially transparent to visible light and yet is a good conductor of electricity. Such a solution can be readily placed between the two sheets of glass 17 and 18 and the unit then sealed as shown in Fig. 4.

In order to effect the passage of electric current through the conducting medium 22, there are provided the two electrodes 23 and 24 arranged in the space between the glass sheets at opposite ends of the unit and having connected thereto at their upper ends the electrical connections 25 and 26 respectively for attachment to a suitable source of power. The electrodes 23 and 24 are preferably of copper but may be of some other metal not affected by the conducting solution used. If copper electrodes are used, they should be treated for a short time by passing an alternating current through them while they are in a sulphuric acid solution in order that they may be coated with an oxide so that bubbles will not form thereon when in use. An alternating current is supplied to the electrodes 23 and 24 whereupon an electrical contact will be made with the electrolyte. The use of an alternating current is required in order to prevent decomposition of the water in the conducting solution. Upon passage of the current through the solution, the said solution will act as a resistance to effect the heating of the glass sheets.

One type of unit which has been produced includes two sheets of one-eighth inch glass spaced from one another to provide a one-quarter inch chamber therebetween. A highly viscous solution of polyvinyl alcohol was made using water as the solvent to which was added about 3% sulphuric acid (by volume). This solution was placed between the two sheets of glass with copper electrodes at the edges thereof and the unit sealed. An alternating voltage was then applied to the electrodes and it was found that the solution had a resistance of 9.5 ohms at 70 degrees Fahrenheit and of 8 ohms at 212 degrees Fahrenheit.

The amount of electrolyte used in the solution will of course vary, but it is desired that an amount of electrolyte be used which will give maximum conductivity at the operating temperature. It is also desired that the glass sheets 17 and 18 be placed as closely together as possible since the farther the heat has to travel outwardly from the path of conduction, the greater the temperature difference between the middle of the unit and its coldest surface will be. That is to say, the space between the glass sheets must be sufficiently wide to obtain sufficient current and, at the same time, kept as small as possible to get the maximum glass surface temperature. Although the use of sulphuric acid has been specified above, other electrolytes may be used such as, for example, sodium sulphate or sodium chloride. Also, pectin, agar agar, or some other material whose water solution is highly viscous, may be substituted for the polyvinyl alcohol.

The conducting solution 22 not only acts to heat the glass sheets substantially uniformly and thereby prevent the clouding, frosting, or icing thereof, but has the further advantage that if the glass is cracked, the solution will not flow out but will seal up the cracks. If desired, the freezing point of the conducting solution can be lowered by the addition of ethylene glycol or the like. While the electrodes 23 and 24 may consist of flat strips of metal, it is preferred that they be arcuately curved as shown in Fig. 3, since with such a formation the operating temperature of the electrodes can be reduced. In some cases it may be found desirable to use sheets of relatively hard plastic in place of the glass sheets 17 and 18, and the invention therefore comprehends the use of a transparent plastic sheet for either or both of the glass sheets.

In Fig. 5 is illustrated a glazing unit similar to that shown in Fig. 2, with the exception that a solid conducting medium instead of a liquid conductor is employed. More particularly, in this case the conducting medium comprises a sheet or layer 27 of a heat hardening plastic such as urea formaldehyde containing a water solution of a metallic salt disposed throughout the plastic. By way of example, a solution containing urea formaldehyde, water, and a salt such as sodium chloride, sodium nitrate, or sodium fluoride can be formed and the solution placed between the glass sheets. The unit is then subjected to sufficient heat to cause the solution to harden into a plastic sheet or layer having the water solution of the metallic salt dispersed throughout the same. The metallic salt will serve as the electrolyte for conducting electric current between the two electrodes 23 and 24 and thereby effect the heating of the glass sheets.

In Fig. 6 is shown another type of glazing unit in which the conducting medium comprises a layer of metallic oxides such as, for example, calcium oxide, which is fused to provide a transparent sheet 28. The metallic oxides are preferably fused and polished before being placed between the glass sheets. The layer of metallic oxides 28 possesses good optical properties and makes a good conductor for the electric current passing between the electrodes 23 and 24.

In Figs. 7, 8 and 9 is shown still another form of glazing unit including two sheets or plates of glass 29 and 30 maintained in predetermined spaced relation by separator strips 31 arranged around the marginal portions thereof. The separator strips 31 may be formed of glass and either fused directly to the glass sheets or secured thereto by a suitable adhesive such as a silicate cement. Disposed between the glass sheets 29 and 30 and in contact therewith is a sheet or plate 32 of a special type of transparent, electrically conducting glass. The sheet 32 is preferably formed of boro-silicate glass having incorporated therein a relatively large proportion of silver oxide (over 40%). This type of glass will conduct electricity and will also function as a resistance to heat the glass sheets. Applied to each vertical end edge of the glass sheet 32 is a metallic coating 33 to which is secured an electrode 34 having the usual electrical connection 35.

It is to be understood that the forms of the invention herewith shown and described are to be taken as illustrative embodiments only of the same and that various changes in the shape, size and arrangement of parts may be resorted to without departing from the spirit of the invention or the scope of the subjoined claims.

I claim:

1. A transparent glazing unit, including a sheet of transparent material, and a transparent electrically conducting medium associated with said sheet comprising a transparent solid body and an electrolyte disposed throughout said body.

2. A transparent glazing unit, including a sheet of transparent material, and a transparent electrically conducting medium associated with said sheet comprising a transparent solid body and a water solution of an electrolyte disposed throughout said body.

3. A transparent glazing unit, including a sheet of transparent material, and a transparent electrically conducting medium associated with said sheet comprising a transparent solid body and an electrolyte in the form of a metallic salt disposed throughout said body.

4. A transparent glazing unit, including a sheet of transparent material, and a transparent electrically conducting medium associated with said sheet comprising a transparent solid body and an electrolyte in the form of a water solution of a metallic salt disposed throughout said body.

5. A transparent glazing unit, including two sheets of transparent material positioned in spaced face to face relation and defining a chamber therebetween, and a transparent electrically conducting medium within said chamber comprising a resinous body and an electrolyte disposed throughout said body.

6. A transparent glazing unit, including two sheets of transparent material positioned in spaced face to face relation and defining a chamber therebetween, and a transparent electrically conducting medium within said chamber comprising a thermosetting resinous body and a water solution of a metallic salt disposed throughout said body.

7. A transparent glazing unit, comprising a transparent body solid at room temperature and having a water solution of an electrolyte disposed throughout the body, and electrodes having electrical contact with said body.

8. A transparent glazing unit, including two sheets of transparent material positioned in spaced face to face relation and defining a chamber therebetween, a transparent electrically conducting medium within said chamber comprising a transparent body and an electrolyte disposed throughout said body, and oxide coated electrodes also disposed between the said sheets and having electrical contact with said conducting medium, and means for supplying alternating current to said electrodes.

9. A transparent glazing unit, including two sheets of transparent material positioned in spaced face to face relation and defining a chamber therebetween, and a transparent electrically conducting medium within asid chamber comprising a transparent body and a water solution of an electrolyte disposed throughout said body.

10. A transparent glazing unit, including two sheets of transparent material positioned in spaced face to face relation and defining a chamber therebetween, and a transparent electrically conducting medium within said chamber comprising a transparent body and an electrolyte in the form of a water solution of a metallic salt disposed throughout said body.

HAROLD K. MOORE.

REFERENCES CITED

The following references are of record in the file of this patent:

UNITED STATES PATENTS

| Number | Name | Date |
|---|---|---|
| 866,462 | Hammer | Sept. 17, 1907 |
| 1,401,303 | Baldwin | Dec. 27, 1921 |
| 1,479,725 | Macy | Jan. 1, 1924 |
| 1,679,252 | Lockwood | July 31, 1928 |
| 1,739,766 | Morris | Dec. 17, 1929 |
| 1,816,711 | Berresford | July 28, 1931 |
| 2,021,661 | Kisfaludy | Nov. 19, 1935 |
| 2,054,937 | Kremer | Sept. 22, 1936 |
| 2,222,742 | Ducret et al. | Nov. 26, 1940 |
| 2,264,285 | Bennett | Dec. 2, 1941 |

FOREIGN PATENTS

| Number | Country | Date |
|---|---|---|
| 356,540 | Great Britain | Sept. 10, 1931 |